(12) United States Patent
Kirino

(10) Patent No.: US 7,365,110 B2
(45) Date of Patent: Apr. 29, 2008

(54) RUBBER COMPOSITION

(75) Inventor: Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 418 days.

(21) Appl. No.: 10/868,856

(22) Filed: Jun. 17, 2004

(65) Prior Publication Data

US 2004/0266915 A1    Dec. 30, 2004

(30) Foreign Application Priority Data

Jun. 27, 2003    (JP)    ............... 2003-184819

(51) Int. Cl.
     *C08K 9/06*    (2006.01)
(52) U.S. Cl. .............. 523/212; 523/215; 524/495
(58) Field of Classification Search ........ 523/212, 523/215; 524/495
See application file for complete search history.

(56) References Cited

U.S. PATENT DOCUMENTS

| | | | |
|---|---|---|---|
| 3,290,165 A | 12/1966 | Inannicelli | |
| 4,218,349 A * | 8/1980 | Minatono et al. | 525/207 |
| 6,372,855 B1 * | 4/2002 | Chino et al. | 525/327.4 |
| 2004/0010089 A1 * | 1/2004 | Ashiura et al. | 525/242 |
| 2004/0054033 A1 * | 3/2004 | Kirino | 523/215 |

FOREIGN PATENT DOCUMENTS

| | | | |
|---|---|---|---|
| JP | 60124639 A * | 7/1985 | |
| JP | 04-233976 A1 | 8/1992 | |
| JP | 09-087612 A1 | 3/1997 | |
| JP | 10-046047 A1 | 2/1998 | |
| JP | 11-116841 A1 | 4/1999 | |
| SU | 767147 B * | 9/1980 | |

* cited by examiner

*Primary Examiner*—Bernard Lipman
(74) *Attorney, Agent, or Firm*—Connolly Bove Lodge and Hutz

(57) ABSTRACT

A rubber composition obtained by blending, into 100 parts by weight of a rubber, 10 to 100 parts by weight of carbon black surface-treated with a silane compound having an amino group (or groups), wherein at least 0.1 part by weight of the rubber ingredient is modified with maleic anhydride, whereby the heat buildup resistance and abrasion resistance of the rubber composition are enhanced and the scorch resistance is improved.

3 Claims, No Drawings ary for the rubber compound and the processability.

RUBBER COMPOSITION

BACKGROUND OF THE INVENTION

1. Field of the Invention

The present invention relates to a rubber composition, more specifically, relates to a rubber composition having improved heat buildup resistance and scorch resistance by the combined use of the specific compounding agents.

2. Description of the Related Art

In the past, as a rubber reinforcing filler for giving a low heat buildup and improving the abrasion resistance, carbon black surface-treated with an organic silicon compound was proposed in, for example, Japanese Unexamined Patent Publication (Kokai) No. 10-46047, Japanese Unexamined Patent Publication (Kokai) No. 11-116841, etc. Further, as the surface-treated carbon black for improving these functions, carbon black surface-treated with a silane coupling compound having an amino group is proposed by Japanese Unexamined Patent Publication (Kokai) No. 9-87612. Further, the present inventors found that the heat buildup resistance and abrasion resistance of a rubber compound are improved by simultaneously blending of carbon black treated with a silane compound having an amino group and a silane coupling agent containing sulfur. However, this causes a problem of a poor scorch resistance.

SUMMARY OF THE INVENTION

Accordingly, the objects of the present invention are to provide a compounding system capable of improving the heat buildup resistance and abrasion resistance of a rubber composition and to also improve the scorch resistance, when using the carbon black treated with a silane compound having an amino group (or groups).

In accordance with the present invention, there is provided a rubber composition comprising 100 parts by weight of a rubber and 10 to 100 parts by weight of carbon black surface-treated with a silane compound having an amino group (or groups), wherein at least 0.1 part by weight of said rubber is modified with maleic anhydride.

In accordance with the present invention, there is also provided a rubber composition comprising 100 parts by weight of a rubber, 10 to 100 parts by weight of carbon black surface-treated with a silane compound having an amino group (or groups) and 0.1 to 20 parts by weight of a silane coupling agent containing sulfur wherein at least 0.1 part by weight of said rubber is modified with maleic anhydride.

DESCRIPTION OF THE PREFERRED EMBODIMENTS

In this specification and in the claims, the singular forms "a", "an" and "the" are intended to include plural references unless the context clearly dictates otherwise.

In the present invention, it was found that, by simultaneously blending carbon black surface-treated with a silane compound having an amino group and a rubber modified with maleic anhydride, the maleic anhydride portion in the rubber has a high reactivity with the amino group(s) at the surface of carbon black and the rubber portion is vulcanizable and, therefore, the maleic anhydride rubber has a coupling effect. Further, by neutralizing the pH of the rubber compound shifted to the alkali side by the aminosilane at the carbon black surface with an acid of the maleic anhydride-modified rubber, the scorch resistance is improved. Further, when a silane coupling agent containing sulfur is further blended into this compounding system, a coupling effect acts between the carbon black surface-treated with the silane coupling agent and rubber, and therefore, a more superior heat buildup resistance is manifested.

The rubbers usable in the rubber composition of the present invention include, for example, natural rubbers (NR) and diene-based synthetic rubbers such as polyisoprene rubbers (IR), various types of styrene-butadiene copolymer rubbers (SBR), various types of polybutadiene rubbers (BR), acrylonitrile-butadiene copolymer rubbers (NBR), butyl rubbers (IIR), etc. may be used. These rubbers may be used alone or in any mixture thereof. When used as a blend rubber of natural rubber and a diene-based synthetic rubber, it is preferable to use at least 60 parts by weight of natural rubber in the blend.

The amount of the carbon black surface-treated with the silane compound having an amino group blended into the rubber composition of the present invention is preferably 10 to 100 parts by weight, based upon 100 parts by weight of the diene-based rubber. If the amount blended is less than 10 parts by weight, the desired effect is not likely to be obtained. Further, if the amount is more than 100 parts by weight, the viscosity of the rubber tends to become too high and the processability tends to be impaired.

Further, the silane coupling agents having an amino group used for the surface treatment of the carbon black include, for example, N-β-(aminomethyl)-γ-aminopropylmethoxysilane, N-β-(aminoethyl)-γ-aminopropylmethylmethoxysilane, N-β-(aminoethyl)-γ-aminopropyltriethoxysilane, γ-aminopropyltrimethoxy-silane, γ-aminopropyltriethoxysilane, N-phenyl-γ-aminopropyltrimethoxysilane, etc. The amount of treatment of the carbon black is preferably 0.1 to 10% by weight, based upon the weight of the carbon black. If the amount of treatment is less than 0.1% by weight, the desired effect is not likely to be manifested. Further, if more than 10% by weight, poor dispersion of carbon black and deterioration of the scorch resistance tend to be caused.

The amount of the rubber modified with the maleic anhydride blended into the rubber composition of the present invention is preferably at least 0.1 part by weight, more preferably 2 to 10 parts by weight, based upon 100 parts by weight of the rubber used. If the amount blended is less than 0.1 part by weight, the desired effects are not likely to be obtained, and therefore, this is not preferable.

The rubber modified with maleic anhydride blended into the rubber composition of the present invention contains a solid maleic anhydride-modified rubber preferably having a molecular weight of 100,000 to 2,000,000 and a liquid maleic anhydride-modified rubber having a molecular weight of preferably not more than 30000, more preferably 10000 to 30000. As the maleic anhydride-modified rubber, a diene-based rubber, butyl rubber or a blend thereof preferably having a maleation rate of 0.2 to 20% by weight of the maleic anhydride reacting with the total weight of the maleic anhydride-modified rubber is used.

As the maleic anhydride-modified rubber effectively used in the present invention, the above liquid maleic acid-modified rubber, for example, maleic acid-modified butyl rubber, liquid maleic acid-modified polyisoprene rubber, liquid maleic acid-modified polybutadiene rubber, etc. is preferably used.

Further, the amount of the silane coupling agent containing sulfur blended into the rubber composition of the present invention is preferably 0.1 to 20 parts by weight, based upon 100 parts by weight of rubber. If the amount blended is less than 0.1 part by weight, the desired effect is not likely to be manifested. Further, if more than 20 parts by weight, the occurrence of scorching is likely to become easier in the mixing or extrusion process, and therefore, this is not desirable.

The silane coupling agents containing sulfur include, for example, 3-mercaptopropyl trimethoxysilane, bis-(3-(triethoxysilyl)-propyl)tetrasulfide, 3-trimethoxysilylpropyl-N,N-dimethylthiocarbamoyl tetrasulfide, trimethoxysilylpropylmercaptobenzo-thiazole tetrasulfide, triethoxysilylpropyl methacrylate monosulfide, dimethoxymethylsilylpropyl-N,N-dimethylthiocarbamoyl tetrasulfide, etc.

The rubber composition of the present invention may contain, in addition to the above essential ingredients, a cross-linking or vulcanization agent, a cross-linking or vulcanization accelerator, various types of oil, an antiaging agent, a softener, a plasticizer, and other various compounding agents blended into rubber for tires or other general rubber. The compounding agents are mixed and the mixture vulcanized by general methods to obtain a rubber composition which may then be used for vulcanization or cross-linking. The amounts of the compounding agents may also be general amounts used in the past so far as the object of the present invention is not adversely affected.

EXAMPLES

The present invention will now be explained further by Examples and Comparative Examples, but, of course, the technical scope of the present invention is not limited by these Examples.

Examples 1 to 13 and Comparative Examples 1 to 7

Preparation of Test Samples

The ingredients, except the sulfur and vulcanization accelerator, in the rubber compounding system shown in the following Table 1 were mixed in a 1.8 liter internal mixer for 3 to 5 minutes. When reaching 165±5° C., the resultant mixture was discharged. Sulfur and the vulcanization accelerator were added to this master batch and the resultant mixture was mixed by an 8-inch open roll to obtain a rubber composition. Part of this rubber composition was used for a scorch and vulcanization test. Next, the remainder of the rubber composition was press vulcanized in a mold of 15 cm×15 cm×0.2 mm at 160° C. for 20 minutes to prepare a test piece (rubber sheet). This was used for a viscoelasticity and abrasion resistance test.

Test Method

1) Scorch time: Time (minutes) by which viscosity rises 5 points at 125° C. measured according to JIS K6300.

2) Vulcanization time: Time (minutes) for reaching vulcanization degree of 95% at 160° C. measured according to JIS K6300.

3) Viscoelasticity: tanδ at 60° C. measured using a viscoelasticity spectrometer made by Toyo Seiki under conditions of an initial stress: 10%, amplitude: ±2%, and frequency: 20 Hz. Indexed to Comparative Example 1 as 100. The larger the figure, the better the heat buildup resistance.

4) Abrasion resistance: Measured using a Lambourn abrasion tester (made by Iwamoto Seisakusho) under conditions of a load of 5 kg, a slip rate of 25%, a time of 4 minutes, and room temperature. Abrasion loss indexed to Comparative Example 1 as 100. The larger the figure, the better the abrasion resistance.

The results are shown in Table I.

TABLE I

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| SBR[1) ] | 132.0 | 132.0 | 132.0 | 132.0 | 132.0 | 132.0 | 132.0 | 132.0 | 132.0 | 132.0 | 132.0 |
| Liquid rubber A[2)] | — | — | — | — | 3.9 | — | — | — | — | — | — |
| Liquid rubber B[3)] | 4.0 | 4.0 | 4.0 | 4.0 | 0.1 | 4.0 | 4.0 | 4.0 | 4.0 | 4.0 | 4.0 |
| Rubber A[4)] | — | — | — | — | — | — | — | — | — | — | — |
| Rubber B[5)] | — | — | — | — | — | — | — | — | — | — | — |
| Aromatic oil | 9.0 | 9.0 | 9.0 | 9.0 | 9.0 | 9.0 | 9.0 | 9.0 | 9.0 | 9.0 | 9.0 |
| Carbon black[6)] | 70.0 | 40.0 | — | — | — | — | — | — | — | — | — |
| Surface treated carbon black A[7)] | — | — | — | — | — | — | — | — | — | 80.0 | — |
| Surface treated carbon black B[8)] | 10.0 | 40.0 | 80.0 | 100.0 | 80.0 | 80.0 | 80.0 | 80.0 | 80.0 | — | — |
| Surface treated carbon black C[9)] | — | — | — | — | — | — | — | — | — | — | 80.0 |
| Surface treated carbon black D[10)] | — | — | — | — | — | — | — | — | — | — | — |
| Silica coupling agent[11)] | 4.0 | 4.0 | 4.0 | 4.0 | 4.0 | — | 0.1 | 8.0 | 20.0 | 4.0 | 4.0 |
| Zinc white | 3.0 | 3.0 | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 | 2.0 | 2.0 |
| Antiaging agent 6PPD[12)] | 1.0 | 1.0 | 1.0 | 1.0 | 1.0 | 1.0 | 1.0 | 1.0 | 1.0 | 1.0 | 1.0 |
| Sulfur | 2.0 | 2.0 | 2.0 | 2.0 | 2.0 | 2.0 | 2.0 | 2.0 | 2.0 | 2.0 | 2.0 |
| Vulcanization accelerator CZG[13)] | 1.7 | 1.7 | 1.7 | 1.7 | 1.7 | 1.7 | 1.7 | 1.7 | 1.7 | 1.7 | 1.7 |
| Scorch time (min) | 24 | 22 | 21 | 25 | 17 | 28 | 28 | 19 | 16 | 24 | 17 |
| Vulcanization time (min) | 13 | 10 | 9 | 13 | 12 | 8 | 8 | 7 | 6 | 19 | 7 |
| Heat buildup resistance (index) | 102 | 110 | 116 | 90 | 102 | 102 | 105 | 123 | 154 | 102 | 125 |
| Abrasion resistance (index) | 103 | 106 | 110 | 120 | 102 | 110 | 110 | 108 | 100 | 101 | 105 |

|  | Comp. Ex. 1 | Comp. Ex. 2 | Comp. Ex. 3 | Comp. Ex. 4 | Comp. Ex. 5 | Comp. Ex. 6 | Ex. 12 | Ex. 13 | Comp. Ex. 7 |
|---|---|---|---|---|---|---|---|---|---|
| SBR[1)] | 132.0 | 132.0 | 132.0 | 132.0 | 132.0 | 132.0 | — | — | — |
| Liquid rubber A[2)] | 4.0 | — | — | — | — | 4.0 | — | — | — |
| Liquid rubber B[3)] | — | 4.0 | 4.0 | 4.0 | 4.0 | — | — | — | — |
| Rubber A[4)] | — | — | — | — | — | — | 50.0 | — | 100.0 |
| Rubber B[5)] | — | — | — | — | — | — | 50.0 | 100.0 | — |
| Aromatic oil | 9.0 | 9.0 | 9.0 | 9.0 | 9.0 | 9.0 | — | — | — |
| Carbon black[6)] | — | 80.0 | 75.5 | 100.0 | — | — | — | — | — |
| Surface treated carbon black A[7)] | — | — | — | — | — | — | — | — | — |
| Surface treated carbon black B[8)] | 80.0 | — | 5.0 | — | — | 80.0 | 50.0 | 50.0 | 50.0 |
| Surface treated carbon black C[9)] | — | — | — | — | — | — | — | — | — |
| Surface treated carbon black D[10)] | — | — | — | — | 80.0 | — | — | — | — |
| Silica coupling agent[11)] | 4.0 | 4.0 | 4.0 | 4.0 | 4.0 | — | 4.0 | 4.0 | 4.0 |
| Zinc white | 3.0 | 3.0 | 3.0 | 3.0 | 3.0 | 3.0 | 5.0 | 5.0 | 5.0 |
| Stearic acid | 2.0 | 2.0 | 2.0 | 2.0 | 2.0 | 2.0 | 3.0 | 3.0 | 3.0 |

TABLE I-continued

| | | | | | | | | | |
|---|---|---|---|---|---|---|---|---|---|
| Antiaging agent 6PPD[12] | 1.0 | 1.0 | 1.0 | 1.0 | 1.0 | 1.0 | 1.0 | 1.0 | 1.0 |
| Sulfur | 2.0 | 2.0 | 2.0 | 2.0 | 2.0 | 2.0 | 1.5 | 1.5 | 1.5 |
| Vulcanization accelerator CZG[13] | 1.7 | 1.7 | 1.7 | 1.7 | 1.7 | 1.7 | 1.2 | 1.2 | 1.2 |
| Scorch time (min) | 15 | 26 | 25 | 18 | 12 | 26 | 25 | 30 | 19 |
| Vulcanization time (min) | 13 | 20 | 15 | 15 | 5 | 9 | 9 | 7 | 12 |
| Heat buildup resistance (index) | 100 | 90 | 95 | 70 | 130 | 87 | 118 | 130 | 100 |
| Abrasion resistance (index) | 100 | 90 | 95 | 110 | 81 | 85 | 115 | 120 | 100 |

(Note)
[1] Nipol 1712 (made by Nippon Zeon), 36 parts by weight oil extended.
[2] Liquid isoprene rubber (made by Kurarey), LIR-50, molecular weight: 50,000.
[3] Maleic anhydride-modified liquid rubber. A (liquid isoprene rubber modified by 4 wt % of maleic anhydride).
[4] Isoprene rubber, molecular weight: 1,200,000.
[5] Maleic anhydride-modified rubber A.
[6] Diablack I (made by Mitsubishi Chemical).
[7] Surface-treated carbon black obtained by making Diablack I loose in form and mixing it with an equal amount of water and 0.1 wt % of aminosilane (made by Unika Japan, A1120) with respect to the carbon black until uniform, then drying it at 100° C.
[8] Surface treated carbon black with 2 wt % aminosilane added.
[9] Surface treated carbon black with 10 wt % aminosilane added.
[10] Surface treated carbon black with 15 wt % aminosilane added.
[11] Si69 (made by Degussa).
[12] Santoflex 6PPD (made by Flexsys).
[13] Noccelar CZG (made by Ouchi Shinko Chemical Industries).

From the above results, it is clear that, by the compounding composition of the present invention, a rubber composition superior in scorch resistance and heat buildup resistance and superior in abrasion resistance can be obtained.

The invention claimed is:

1. A rubber composition comprising 100 parts by weight of a rubber and 10 to 100 parts by weight of carbon black surface-treated with a silane compound having an amino group or amino groups, at least 0.1 part by weight of said rubber being modified with maleic anhydride, wherein said surface-treated carbon black is obtained by treating the carbon black with 0.1 to 10 wt %, based upon the weight of the carbon black, of a silane compound having an amino group or amino groups.

2. A rubber composition as claimed in claim 1 further comprising 0.1 to 20 parts by weight of a silane coupling agent containing sulfur.

3. A rubber composition as claimed in claims 1 or 2, wherein said maleic anhydride-modified rubber has a main chain of a diene-based rubber, butyl rubber or a blend thereof, and wherein the diene-based rubber, butyl rubber or blend thereof has a maleation rate of 0.2 to 20% by weight of the maleic anhydride reacting with the total weight of the maleic anhydride-modified rubber.

\* \* \* \* \*